US008432791B1

(12) United States Patent
Masters (10) Patent No.: US 8,432,791 B1
(45) Date of Patent: Apr. 30, 2013

(54) NETWORK ROUTE INJECTIONS

(75) Inventor: Richard R. Masters, Seattle, WA (US)

(73) Assignee: F5 Networks, Inc., Seattle, WA (US)

( * ) Notice: Subject to any disclaimer, the term of this patent is extended or adjusted under 35 U.S.C. 154(b) by 1057 days.

(21) Appl. No.: 11/246,315

(22) Filed: Oct. 7, 2005

Related U.S. Application Data

(60) Provisional application No. 60/703,561, filed on Jul. 29, 2005.

(51) Int. Cl.
*H04L 1/00* (2006.01)
(52) U.S. Cl.
USPC .......................................................... 370/221
(58) Field of Classification Search ............. 370/40–401
See application file for complete search history.

(56) References Cited

U.S. PATENT DOCUMENTS

| 7,047,300 | B1 * | 5/2006 | Oehrke et al. | 709/226 |
|---|---|---|---|---|
| 7,423,995 | B1 * | 9/2008 | Elliott et al. | 370/332 |
| 7,451,209 | B1 * | 11/2008 | Schieber et al. | 709/224 |
| 2002/0165982 | A1 * | 11/2002 | Leichter et al. | 709/244 |
| 2002/0188763 | A1 * | 12/2002 | Griffin | 709/310 |
| 2003/0074466 | A1 * | 4/2003 | Hughes et al. | 709/238 |
| 2004/0122935 | A1 * | 6/2004 | Blam et al. | 709/223 |
| 2004/0133690 | A1 * | 7/2004 | Chauffour et al. | 709/229 |
| 2006/0193252 | A1 * | 8/2006 | Naseh et al. | 370/225 |
| 2006/0248017 | A1 * | 11/2006 | Koka et al. | 705/59 |
| 2008/0172323 | A1 * | 7/2008 | Feilbogen et al. | 705/37 |

OTHER PUBLICATIONS

Wollman, William et al., "Plug and Play Server Load Balancing and Global Server Load Balancing for Tactical Networks", The MITRE Corporation, pp. 1-5, 2003.

F5 Networks, Inc., "BIG-IP Reference Guide Version 4.5", Man-0044-01, Chapters 4 and 8, pp. 4-1 through 4-62 and 8-1 through 8-6, 2002.

Cisco Systems, Inc., "Configuring Health Monitoring Documentation", pp. 1-12, Posted Jan. 18, 2003. http://www.cisco.com/univercd/cc/td/doc/product/lan/cat6000/cfgnotes/csm/helthmon.htm.

Cisco Systems, Inc., "BGP Conditional Rout Injection Documentation", pp. 1-11, posted on Nov. 17, 2005. http://www.cisco.com/univercd/cc/td/doc/product/software/ios122/122newft/122t/122t4/ftbgpri.htm.

Bates and Rekhter, "Scalable Support for Multi-homed Multi-provider Connectivity", RFC 2260, pp. 1-12, Jan. 1998.

* cited by examiner

*Primary Examiner* — Andrew Chriss
*Assistant Examiner* — Kenan Cehic
(74) *Attorney, Agent, or Firm* — Frommer Lawrence & Haug LLP; Jamie L. Wiegand (57) ABSTRACT

A method, system, and apparatus for managing routing to redundant data centers. Each data center has an associated traffic management device (TMD) that manages traffic with at least one server. The TMDs may determine a priority for the data centers, and advertise that priority, along with other configuration information, to at least one designated router. The configuration information includes a Virtual Internet Protocol (VIP) address that is identical for each of the TMDs. Based on the advertised priorities the designated router routes network traffic to at least one of the data centers. Each TMD monitors a variety of criteria to determine if it is appropriate to change the priority of its associated data center to the designated router. If a data center's priority changes, the associated TMD advertises the change to the designated router, enabling it to dynamically update its routing tables to direct traffic towards a different data center.

19 Claims, 5 Drawing Sheets

NETWORK ROUTE INJECTIONS

CROSS-REFERENCE TO RELATED APPLICATIONS

This application claims the benefit of U.S. Provisional Application Ser. No. 60/703,561 entitled "Network Route Injections," filed on Jul. 29, 2005, the benefit of the earlier filing date of which is hereby claimed under 35 U.S.C. §119 (e) and which is further incorporated herein by reference.

FIELD OF THE INVENTION

The invention relates generally to computing connectivity, and more particularly but not exclusively to managing connectivity to data based upon, in part, a failure condition.

BACKGROUND OF THE INVENTION

The Internet has evolved into a ubiquitous network that has inspired many companies to rely upon it as a major resource for doing business. For example, many businesses may utilize the Internet, and similar networking infrastructures, to manage critical applications, access content servers, automate assembly and production lines, and implement complex control systems. Moreover, many individuals expect to be able to always access a resource virtually any time. As the reliance by businesses on access to such networked resources for their success increases, the availability of the systems that provide these services becomes even more critical.

In response to the need for a networking infrastructure that provides both high availability of system resources and protection from failures, many businesses have attempted to implement redundant data centers that are intended to enable a business to direct network traffic to an alternate data center during a failure of a selected primary data center. However, many of today's traditional implementations of redundant data centers might require an end-user's device that is attempting to access the redundant data center to somehow recognize the failover event and reconfigure itself to communicate with the failed-over secondary data center. Unfortunately, many of today's end-user devices might not be configured to perform such actions, or might do so with a significant delay. Moreover, other configurations of redundant data centers might further restrict the conditions that a business may test on to invoke a failover event. Thus, it is with respect to these considerations, and others, that the present invention has been made.

BRIEF DESCRIPTION OF THE DRAWINGS

Non-limiting and non-exhaustive embodiments of the invention are described with reference to the following drawings. In the drawings, like reference numerals refer to like parts throughout the various figures unless otherwise specified.

For a better understanding of the invention, reference will be made to the following Detailed Description of the Invention, which is to be read in association with the accompanying drawings, wherein.

DETAILED DESCRIPTION OF THE INVENTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

In addition, the term "route injection" is process of sending information to a network device, such as a router, and is directed towards having the network device update its routing information. Route injections may be performed using a variety of mechanisms, including sending of a network advertisement that indicates a change on a network. Such advertisements may, for example, be in a form of a link-state packet, or other dynamic routing protocol message format that is useable to communicate a change in the network.

Briefly stated, the invention is directed towards a system, apparatus, and method for managing network route injections for use in updating routing information, such as may be associated with routing network traffic to multiple data centers. Each data center includes a traffic management device (TMD) that is configured to manage network communications with at least one server in the data center. In one embodiment each TMD is configured to communicate with at least one other TMD associated with another data center. The TMDs may determine a data center priority based on one or more conditions. In one embodiment, the TMDs may determine that one data center might have a priority that indicates it is a primary data center. Such prioritizations may be indicated employing any of a variety of indicators. For example, a priority that indicates one device is to have preference over another device, at least with respect to receiving and/or sending network traffic, may be represented by a numeric value. In one embodiment, a lower numeric value may indicate a higher priority. For example, a value of zero may indicate the highest priority for a data center such that it is the data center preferred over another data center for which network traffic is to be sent. Thus, each data center will have a priority value indicating a preferred order in which to employ the data centers. Moreover, in one embodiment, selection of the highest priority data center may result in sending no network traffic to data centers with lower priorities.

In any event, the determined priorities, as well as other configuration information, may be advertised to at least one router. The configuration information includes a Virtual Internet Protocol (VIP) address that is identical across each of the TMDs. The VIP address can then be assigned to each of the TMDs. However, because the VIP address might not be currently assigned and recognized by each TMD, the VIP address is termed to be 'assignable.' Part of assigning the VIP address to each TMD may include configuring the TMD to use the VIP address to send and/or receive a network packet. Moreover, each TMD may also include a unique (physical) IP address in its respective configuration information. Based on the advertised priorities, the router may route network traffic towards a higher priority the data center. Each TMD monitors a variety of criteria to determine if it is appropriate to change its advertised priority to the router. Such criteria might include, for example, a specified minimum number of failed servers across all data centers, a specified minimum number of failed servers within a particular data center, a minimum average number of failed servers across one or more data servers, a minimum percentage of failed servers, a failed service, a quality of service metric, or the like. It is important to note however, that any of a variety of other criteria may be employed to determine if it is appropriate to change an advertised priority to the router. Thus, the above are merely examples and are not intended to limit the scope or spirit of the invention. In one embodiment, another network device might provide a priority to each of the TMDs, which in turn advertise that priority to the router. If a data center's priority changes, the TMD advertises the change to the router, enabling the router to dynamically update its routing of traffic. Thus, by using identical VIP addresses for the TMDS and enabling the router to dynamically update its route information, delayed access to a resource by a client device may be minimized. Moreover, as described below, the router may be 'centralized' with respect to the data centers, be implemented as redundant routers distributed across the data centers, or any of a variety of other networking architectures.

Illustrative Operating Environment

Figure 1:
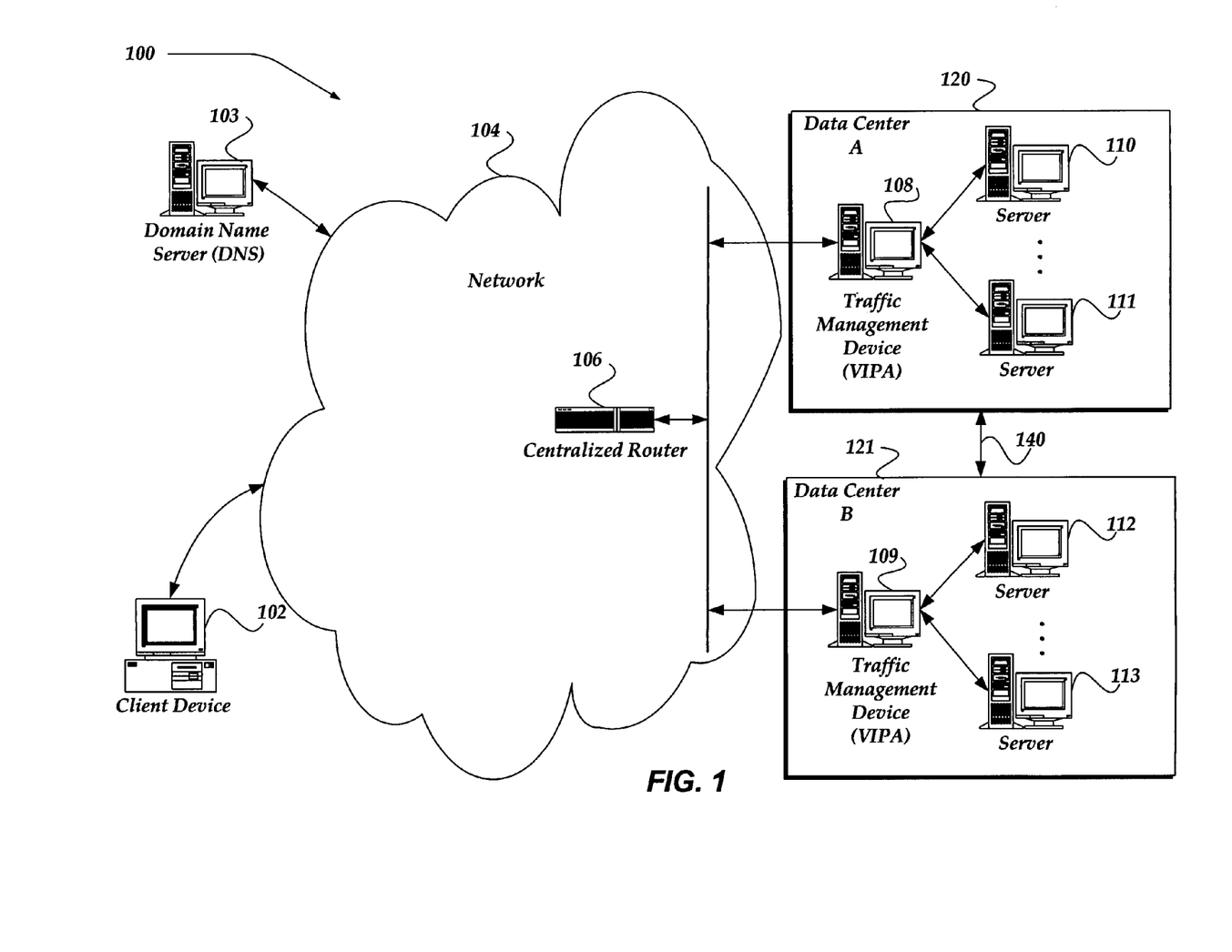
FIG. 1 shows a functional block diagram illustrating one embodiment of an environment for practicing the invention.

FIG. 1 illustrates one environment in which the invention may operate. However, not all of these components may be required to practice the invention, and variations in the arrangement and type of the components may be made without departing from the spirit or scope of the invention. Briefly, as shown in FIG. 1, multiple data centers are configured to employ a centralized router that dynamically updates its traffic routing scheme based, in part, on a received priority from network devices having a same VIP address. The received priority indicates which of the data centers and/or components within the data centers have priority over another data center and/or components within the other data centers for sending and receiving network traffic.

As shown in the figure, system 100 includes client device 102, Domain Name System (DNS) server 103, network 104, and data centers 120-121. Network 104 includes centralized router 106. Data center 120 includes Traffic Management Device (TMD) 108, and servers 110-111. Data center 121 includes TMD 109 and servers 112-113.

Network 104 is in communication with and enables communications between DNS server 103, client device 102, centralized router 106, and TMD 108-109. TMD 108 is in further communications with centralized router 106 and servers 110-111, while TMD 109 is in further communications with centralized router 106 and servers 112-113.

Generally, client device 102 may include virtually any computing device capable of connecting to another computing device to send and receive information, including emails, browser transactions, requests for information from a server, and the like. The set of such devices may include devices that typically connect using a wired communications medium such as personal computers, multiprocessor systems, microprocessor-based or programmable consumer electronics, network PCs, and the like. The set of such devices may also include devices that typically connect using a wireless communications medium such as cell phones, smart phones, radio frequency (RF) devices, infrared (IR) devices, integrated devices combining one or more of the preceding devices, or virtually any mobile device. Similarly, client device 102 may be any device that is capable of connecting using a wired or wireless communication medium such as a PDA, POCKET PC, wearable computer, and any other device that is equipped to communicate over a wired and/or wireless communication medium.

Client device 102 may further include a client application that is configured to manage various actions. Moreover, client device 102 may also include a web browser application, that is configured to enable an end-user to interact with other devices and applications, over network 104. In one embodiment, the web browser is configured to provide various functions, including, but not limited to, authentication, enabling multiple requests for information, and the like. The web browser may further enable inputs, such as keyboard, mouse, audio, and the like.

Network 104 is configured to couple client device 102, with other network devices. Network 104 is enabled to employ any form of computer readable media for communicating information from one electronic device to another. In one embodiment, network 104 is the Internet. Moreover, network 104 may include local area networks (LANs), wide area networks (WANs), direct connections, such as through a universal serial bus (USB) port, other forms of computer-readable media, or any combination thereof. On an interconnected set of LANs, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 104 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices with various degrees of mobility. For example, network 104 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 104 may include any communication method by which information may travel between one network device and another network device.

Additionally, network 104 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

DNS server 103 may include any computing device capable of managing protocols that enable locating of network devices on a network by a domain name, in part, by enabling a translation of the domain name into a corresponding Internet Protocol (IP) address. DNS server 103 might employ a database of domain names (host names) and their corresponding IP addresses and/or provide at least a portion of the domain name to another DNS server (not shown) to resolve the domain name into an IP address.

DNS server 103 may receive a request designating a domain name associated with data centers 120-121 from client device 102. DNS server 103 may resolve the domain name into an IP address based on information provided by at least one of TMDs 108-109. At least one of TMDs 108-109 may, for example, provide a VIP address that is shared among TMDs 108-109 for use in resolving the domain name. Traditionally, TMDs 108-109 might provide a different VIP address for TMD 108 than for TMD 109. However, in the present invention, a single VIP address might be employed. Client device 102 might then provide the VIP address to various network devices within network 104, including centralized router 106, to route traffic towards at least one of data centers 120-121.

Devices that may operate as DNS server 103 includes personal computers, desktop computers, multiprocessor systems, microprocessor-based or programmable devices, network devices, servers, and the like.

Centralized router 106 represents virtually any network device that receives and routes a network packet towards a destination and is centrally situated to route network packets. Typically, centralized router 106 is not configured within the data centers, but rather is outside of them. Thus, it may be viewed as central to the data centers. Centralized router 106 is typically employed to extend or segment networks by routing the packet from one subnet to another. As shown in the figure, centralized router 106 may represent a router existing on a network border.

Centralized router 106 may receive the packet from client computer 102 through network 104, and route it towards at least one of TMDs 108-109. Similarly, centralized router 106 may receive the packet from TMDs 108-109, and route it towards client computer 102.

Centralized router 106 may read a network address in the received packet and make a decision on how to route it based on any of a variety of dynamic routing protocols, including distance vector protocols, link state protocols, hybrid protocols, or the like.

Centralized router 106 may receive information from various network devices that enable it to route the network packet. Such information may be received through a network advertisement, or the like, and include configuration information such as a physical device address, an availability, a VIP address, or the like. In one embodiment, the configuration information includes a priority associated with a device. For example, TMDs 108-109 may provide a priority indicating to which of the TMDs network traffic preferably might be directed. Thus, TMDs 108-109 may both employ the same VIP address, while having traffic routed to one of the TMDs based at least in part on their advertised priorities. This is intended toward improving traffic flow during failovers of one of the illustrated data centers and/or components with the data centers. Centralized router 106 may employ a process such as described below in conjunction with FIG. 5 to perform at least some of its actions.

Centralized router 106 typically operates at layer three of the typical Open Systems Interconnection (OSI) reference model for networking. However, centralized router 106 may also provide additional functionality that operates above layer three for TCP/IP in the OSI reference model, and the like.

Centralized router 106 may include virtually any specialized computer that is optimized for communications. Centralized router 106 may also represent a set of router actions that are incorporated into a server, network card, and the like. Centralized router 106 may also be implemented as a network-layer bridge, gateway, layer three switch, or the like.

Data centers 120-121 represent virtually any configuration of computing devices intended to provide data and services for use by another computing device. Data centers 120-121 may include, for example, a variety of servers, such as servers 110-113. Each of the data centers 120-121 may be implemented, for example, on different networking segments, LANs, or the like. In one embodiment, data centers 120-121 might be situated in geographically different regions.

Data centers 120-121 may also be configured to provide redundancy services to the other computing device, and to enable at least one of the data centers to respond to network requests when the other data center fails. Data centers 120-121 may be provide redundancy services at a device level, an application level, a service level, or the like. In one embodiment, data centers 120-121 may communicate with each other, mirroring communications through link 140 to further minimize delays during a failover situation. Thus, data centers 120-121 might be considered to provide redundant services.

Data centers 120- and 121 include servers 110-111 and servers 112-113, respectively. Servers 110-113 may include any computing device capable of communicating packets with another computing device. Each packet may convey a piece of information. A packet may be sent for handshaking, i.e., to establish a connection or to acknowledge receipt of data. A single packet or a combination of packets may include information such as a request, a response, or the like. Generally, packets received by servers 110-113 will be formatted according to TCP/IP, but they could also be formatted using another transport protocol, such as User Datagram Protocol (UDP), Internet Control Message Protocol (ICMP), NETbeui, IPX/SPX, token ring, and the like. Moreover, the packets may be communicated between servers 110-113, TMDs 108-109, and client device 102 employing HTTP, HTTPS, and the like.

In one embodiment, servers 110-113 are configured to operate as web servers. However, servers 110-113 are not limited to web servers, and may also operate messaging servers, File Transfer Protocol (FTP) servers, database servers, content servers, or the like. Additionally, each of servers 110-113 may be configured to perform a different operation. Thus, for example, server 110 may be configured as a messaging server, while server 111 is configured as a database server. Moreover, while servers 110-113 may operate as other than a website, they may still be enabled to receive an HTTP communication. A single server may include multiple servers performing the same or different operations, providing the same or different content.

Devices that may operate as servers 110-113 include personal computers desktop computers, multiprocessor systems, microprocessor-based or programmable consumer electronics, network PCs, servers, blade servers, and the like.

One embodiment of TMDs 108-109 is described in more detail below in conjunction with FIG. 3. Briefly however, TMDs 108-109 includes virtually any device that manages network traffic. Such devices include, for example, routers, proxies, firewalls, load balancers, cache devices, devices that perform network address translation, any combination of the preceding devices, and the like. TMDs 108-109 may, for example, control the flow of data packets delivered to and forwarded from an array of servers, such as servers 110-111 and/or 112-113. TMDs 108-109 may direct a request for a resource to a particular server based on network traffic, network topology, capacity of a server, content requested, and a host of other traffic distribution mechanisms. TMDs 108-109 may receive data packets from and transmit data packets to the Internet, an intranet, or a local area network accessible through another network, such as network 104.

TMDs 108-109 may recognize packets that are part of the same communication, flow, and/or stream and may perform special processing on such packets, such as directing them to the same server so that state information is maintained. TMDs 108-109 also may support a wide variety of network applications such as web browsing, email, telephony, streaming multimedia and other traffic that is sent in packets. TMDs 108-109 may also control non-packetized network traffic, such as analog signals.

At least one of TMDs 108-109 may receive requests from client device 102 through centralized router 106 based at least, in part, on an advertised priority. The receiving TMD may select a server from servers 110-111 or 112-113, as appropriate, to forward the request. TMDs 108-109 may employ any of a variety of criteria and mechanisms to select the server, including those mentioned above, load balancing mechanisms, and the like. TMDs 108-109 are further configured to receive a response to the request and to forward the response towards client device 102 through centralized router 106.

TMDs 108-109 are further configured to advertise configuration information to another network device, such as centralized router 106, or the like. Such configuration information might include a physical network address, a VIP address, a priority, or the like. In one embodiment, the VIP address is the same for each of TMDs 108-109; however, the physical network addresses are different for each TMD. The priority for each TMD may be determined based on any of a variety of conditions, events, or the like. For example, as data centers 130-131 are initially configured, one of the data centers may be selected as a primary data center, while another data center may be selected as the secondary or backup data center. Such selections may be based on a variety of conditions, including costs, convenience, location, component configurations, staffing, or the like. TMDs 108-109 may employ virtually any of a variety of networking protocols to advertise its configuration.

As conditions change, at least one of TMDs 108-109 may revise its priority and send the revised priority to centralized router 106. In one embodiment, the revised priority may result in centralized router 106 dynamically updating its routing scheme, such that at least some of the traffic that may have originally been directed toward one of TMDs 108-109 is now directed towards a different one of TMDs 108-109. Any of a variety of conditions may result in the at least one TMD to revise its priority, including a failover of a component of a data center, a failure of some number of servers above some minimum number of servers, a failure of some percentage of servers above a minimum percentage of servers, a failure of a particular service provided by the data center, a failure of an IP address, a predetermined reduction in a quality of service metric, a load exceeding a predetermined measure, or the like. In one embodiment, the priority may be based on a number of servers available that are serviced by the particular TMD. TMDs 108-109 may employ a process such as described below in conjunction with FIG. 4 to manage their priorities and to advertise those priorities to another network device, such as centralized router 106.

TMDs 108-109 may be implemented using one or more personal computers, servers, multiprocessor systems, microprocessor-based or programmable consumer electronics, network PCs, radio frequency (RF) devices, infrared (IR) devices, integrated devices combining one or more of the preceding devices, and the like. Such devices may be implemented in hardware, software, or a combination thereof. For example, such devices may include some application specific integrated circuits (ASICs) coupled to one or more microprocessors. The ASICs may be used to provide a high-speed switch fabric while the microprocessors may perform higher layer processing of packets. An embodiment of a network device that could be used as TMDs are devices 108-109 is network device 300 of FIG. 3, configured with appropriate software. The BIG-IP® family of traffic managers, by F5 Networks of Seattle, Wash., are examples of TMDs. In one embodiment, one or more of TMDs 108-109 may be integrated with one or more of servers 110-113, and provide content or services in addition to the TMD functions described herein.

It is noted that the invention is not limited to a single TMD per data center. For example, each data center may include a plurality of TMDs, each of which is configured to manage a plurality of servers. For example, in one embodiment, data centers 130-131 may include multiple TMDs, each configured to manage a particular type of service, request, content, or the like. As such, centralized router 106 may be configured to route traffic to the appropriate TMD within a given data center based on this additional configuration information. In one embodiment, two or more TMDs at a data center process traffic sequentially, and either one, or a combination of them, performs the methods of the present invention.

Figure 2:
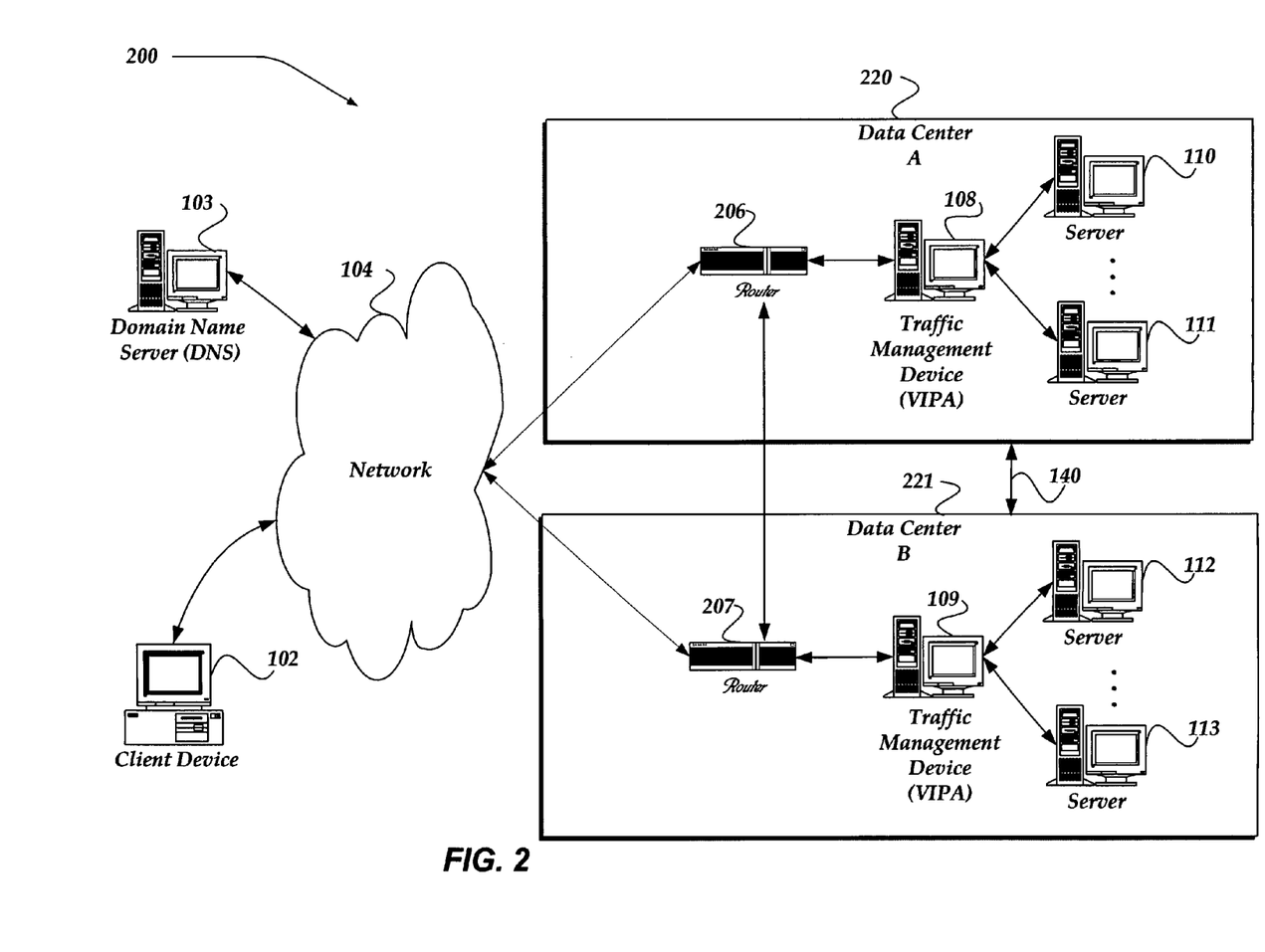
FIG. 2 shows a functional block diagram illustrating another embodiment of an environment for practicing the invention.

FIG. 2 shows a functional block diagram illustrating another environment for practicing the invention. Not all of the illustrated components may be required to practice the invention, and variations in the arrangement and type of the components may be made without departing from the spirit or scope of the invention. Briefly, as shown in FIG. 2, multiple data centers are configured to employ redundant routers that dynamically update their routing scheme based, in part, on received priorities from TMDs, each TMD having the same VIP address as the other TMDs. The received priorities indicate which of the data centers and/or components within the data centers have preference over the other data centers, for sending and receiving network traffic over another data center and/or components within the other data centers.

At least one of the redundant routers may be used to route the network traffic between at least one data center and network 104.

As shown in FIG. 2, system 200 includes client device 102, Domain Name Service (DNS) server 103, network 104, and data centers 220-221. Data center 220 includes redundant router 206, TMD 108, and servers 110-111. Data center 121 includes redundant router 207, TMD 109, and servers 112-113. In one embodiment, the TMD in each data center receives and forwards packets going to and from the servers of the data center. In one embodiment, the TMD receives and forwards only packets going in one direction, such as packets going toward the servers, but not coming from the servers, and packets in the reverse direction are sent directly between the servers and the router.

Components numbered similarly to those in FIG. 1 operate similarly. Moreover, data centers 220-221 operate substantially similar to data centers 120-121 in FIG. 1, except for the presence of redundant routers 206-207, and the absence of centralized router 106 as shown in FIG. 1.

As shown in FIG. 2, redundant routers 206-207 are configured to receive configuration information from a respective TMD (108-109), and to share such configuration information with each other. Moreover, as shown in the FIG. 2, redundant routers 206-207 are situated within a data center, while centralized router 106 of FIG. 1 is external to the data centers, but situated centrally.

In one embodiment, at least one of redundant routers 206-207 may manage traffic between network 104 and data centers 220-221 based on the received configuration information, including priority information. For example, in one embodiment, redundant router 206 might be selected as a primary router for managing the flow of traffic to/from both data centers, while redundant router 207 may be designated as a backup router should redundant router 206 be deemed to have failed. A determination of failure may be based on a variety of criteria, including a failure to respond to a network inquiry within a defined period of time, a detected predefined aberrant behavior of a device over a period of time, or satisfaction of virtually one or more of the failure criteria described below.

Implementation of redundant routing may be achieved using any of a variety of mechanisms. Thus, for example, in one embodiment, network traffic may be received by both redundant routers 106-107, however, only the designated primary redundant router (that router with the highest priority) might route the traffic. However, the invention is not so constrained, and any of a variety of implementations may be used, without departing from the scope of spirit of the invention.

In addition, both redundant routers 206-207 may dynamically update their respective routing tables in anticipation of assuming a primary routing role. Thus, as illustrated, redundant routers 206-207 may operate substantially similar to centralized router 106 of FIG. 1, with the additional benefit of providing redundancy to the other router (whereas, centralized router 106 may not have a 'backup' router associated with it). In addition, redundant routers 207-207 may employ a process substantially similar to that described below in conjunction with FIG. 5 to perform at least some of its actions.

Illustrative TMD Environment

Figure 3:
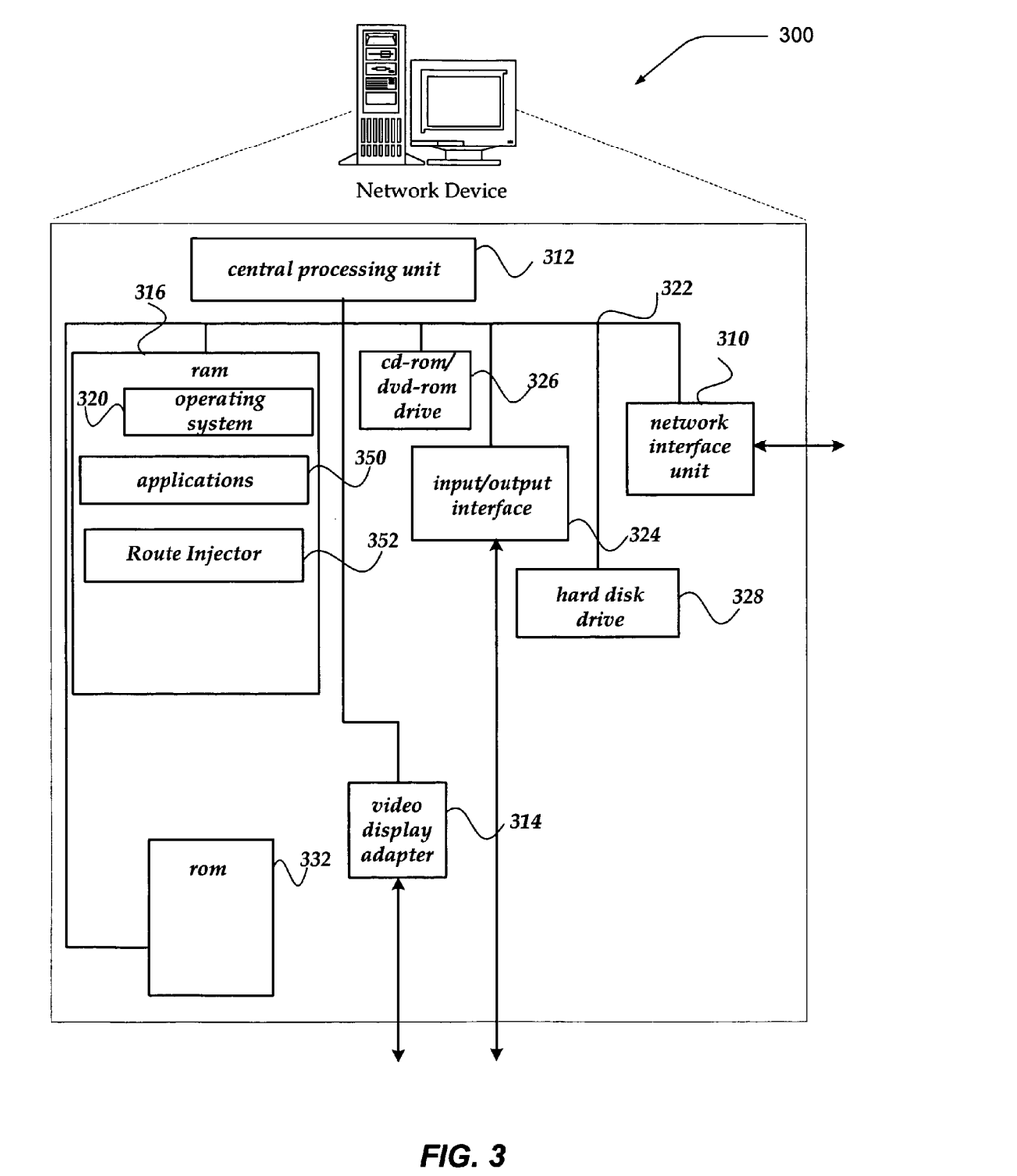
FIG. 3 shows one embodiment of a network device that may be included in a system implementing the invention.

FIG. 3 shows one embodiment of a network device, according to one embodiment of the invention. Network device 300 may include more or less components than those shown. The components shown, however, are sufficient to disclose an illustrative embodiment for practicing the invention. Network device 300 may represent, for example, TMDs 108-109 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed.

As illustrated in FIG. 3, network device 300 also can communicate with the Internet, or some other communications network, such as network 104 in FIG. 1, via network interface unit 310. Network interface unit 310 sends and receives packets between network device 300 and the network, and is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include email programs, routing programs, schedulers, calendars, database programs, word processing programs, HTTP programs, security programs, and so forth. Mass storage may further include applications such as route injector 352.

Route injector 352 is configured to manage route injections by way of an advertisement, or the like, to another network device, such as centralized router 106 of FIG. 1, and/or redundant routers 206-207 of FIG. 2. Such advertisements are directed towards prompting the other network device to dynamically update the routing scheme it uses to direct traffic. The result might be to redirect traffic to or away from a data center, TMD, or the like. Route injector 352 may accomplish this, in part, by providing with the advertisement a priority.

The advertisement may also include other configuration information, including a VIP address associated with network device 300, a physical address associated with network device 300, or the like, along with the priority. The priority may indicate whether network device 300 is to be preferred over another traffic management device, for routing of at least some network traffic. For example, the priority may indicate a global decision to redirect virtually any traffic associated with the provided VIP address towards or away from network device 300. However, the invention is not so limited. For example, the priority might also indicate that network device 300 is to be preferred for routing FTP traffic, while another network device might be preferred for routing database requests.

An initial priority may be selected based on any of a variety of criteria, including a random or arbitrary decision, a data center preference, a service preference, a cost, a geographic location preference, or the like, including combinations of the criteria. In one embodiment, the priority information of network device 300 is shared with other network devices operating as traffic management devices for redundant data centers. Thus, for example, TMDs 108-109 of FIG. 1 might share priority information among each other. In one embodiment, the initial priority might be voted upon based on a rule within the TMDs.

The priority for network device 300 may change based on any of a variety of conditions. For example, the priority may change when there is a failover condition within the servers, services, and/or hardware managed by network device 300. The priority may also change when there is a need to balance loads between network device 300 and another network device. The priority may also change based on a variety of other conditions of a data center, including when more than a minimum number of servers are determined to be failed, when more than a minimum percentage of servers are determined to be failed, when a particular service is determined to be failed, when a particular network address is determined to be non-responsive or otherwise failed, when a predefined quality of service measure is below some value, or based on virtually any other measure of availability. In one embodiment, the priority might be set, and thereby also change, based on a number of servers available, a percentage of servers and/or services available, or the like.

If it is determined that the priority has changed, route injector 352 may provide the revised priority to the other router, network device, or the like. The other network device or router may then employ a dynamic routing protocol to dynamically update its routing scheme used to direct traffic towards or away from network device 300. Moreover, network device 300 might further share its changed priority with the other network devices operating at traffic management devices for the redundant data centers (e.g., TMD 108 might share its changes with TMD 109, and vice versa.).

Generalized Operation

Figure 4:
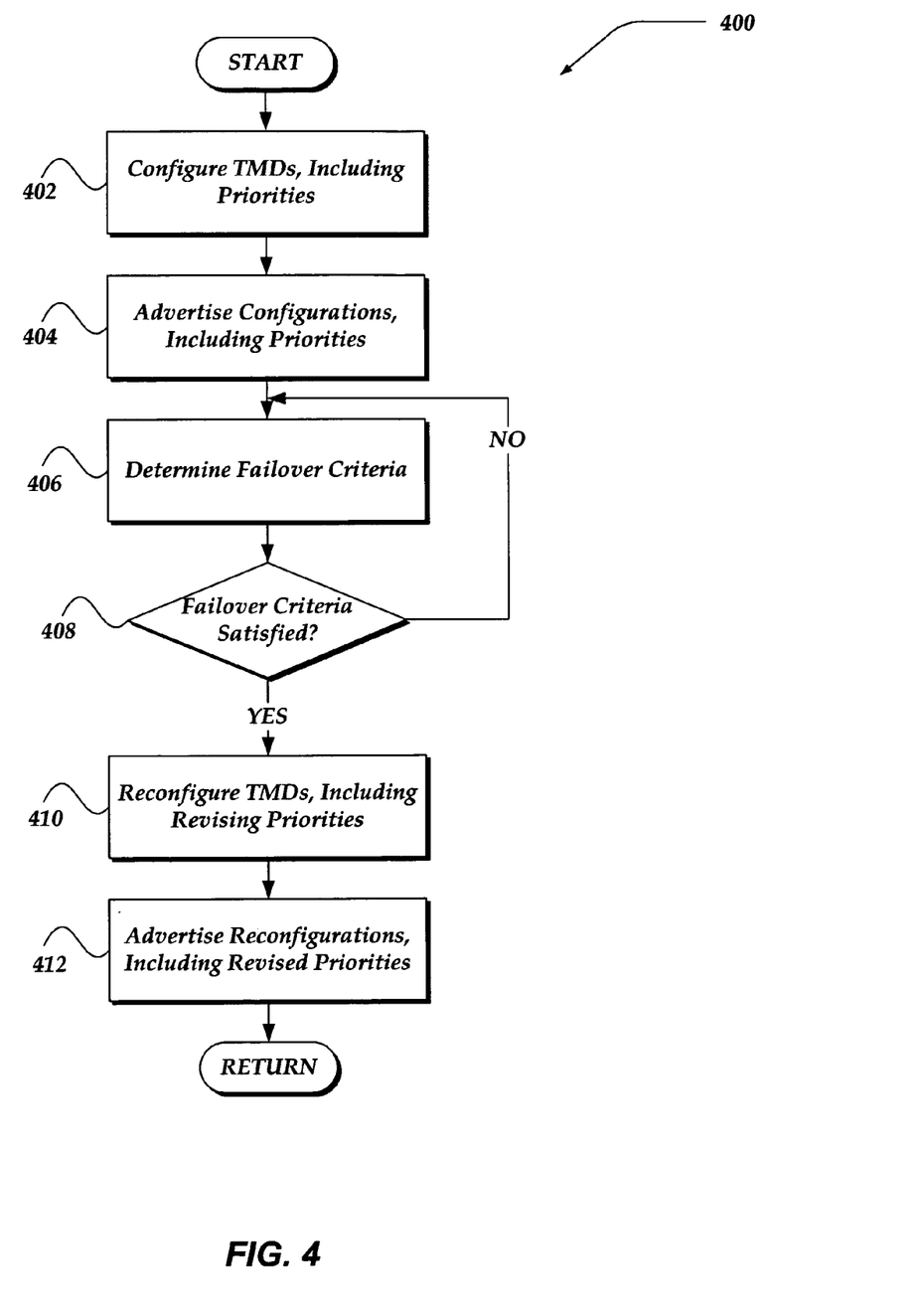
FIG. 4 illustrates a logical flow diagram generally showing one embodiment of a process for managing route injection changes during a failover.

The operation of certain aspects of the invention will now be described with respect to FIG. 4. FIG. 4 illustrates a logical flow diagram generally showing one embodiment of a process for managing route injection changes during a failover. Process 400 of FIG. 4 may be implemented within TMDs 108-109 of FIGS. 1-2.

Process 400 begins, after a start block, at block 402 where the TMD is configured. Configuration includes, for example, determining an initial priority. As stated above, the initial priority may be determined based on any of a variety of criteria. In addition, at block 402, a VIP address may be determined based on the TMD, a portion of the servers managed by the TMD, a portion of the services within the data center for which the TMD is assigned, or the like.

Processing flows to block 404 where the TMD prepares and sends an advertisement, including the priority, to a router, or other network device. For example, the advertisement might be sent to centralized router 106 of FIG. 1, redundant router 206 and/or 207 of FIG. 2, or the like. In one embodiment, the advertisement might also be sent to other TMDs assigned to the associated redundant data centers.

Process 400 continues to block 406 where the failover criteria may be determined, at least in part by configuring the TMDs with the failover criteria that is to be monitored. In any event, the failover criteria may be provided by an end-user such as a system administrator, or the like, include any of the above mentioned criteria, as well as virtually any other failover criteria. Moreover, the failover criteria may be dynamically reconfigured. That is, based on a rule, condition, event, or the like, the failover criteria that that the TMDs may be monitoring for may be dynamically modified. For example, a security issue detected by another device may direct the TMDs to employ a different failover criterion. Moreover, the failover criteria may be automatically reconfigured based on a time period. For example, in one embodiment, a failover may be considered to be tolerated differently (either less tolerated, or more tolerated) during evening hours, or weekends, than during other times of a day. Failover criteria may also be reconfigured when it is determined that an administrator is not on site. Failover criteria may be reconfigured when a type of resource requested. For example, when a higher percentage of high-priority (secure) resources are requested, tolerance for a failover may be higher, resulting in potential for changing the failover criteria. In addition, other events, factors, or the like, may also result in a change in the failover criteria, including a change in a number of servers being load-balanced; receiving a message indicating that an external resource, such as a standby device, data center, or the like, is no longer available; receiving a message that a local resource, such as a backup power device, a cooling system, or the like, is no longer available; or the like.

Processing proceeds to decision block 408, where monitoring is performed to determine whether the failover criteria has been substantially satisfied. A failover criteria may be substantially satisfied because of a variety of reasons. For example, where multiple failover criteria are being monitored, a substantial failover may be detected where a majority of the failover criteria are satisfied, a predefined set of higher priority failover criteria are satisfied, or the like.

It should be noted that while monitoring of failover criteria is being performed, the TMD might also be performing traffic management duties, including determining how to route incoming/outgoing packets based on any of several different traffic management data. Such data include, but are not limited to, round trip time (RTT), round robin, least connections, packet completion rate, quality of service, traffic management device packet rate, topology, global availability, hops, a hash of an address in a received packet, static ratios, dynamic ratios, or the like. In any event, if the failover criteria is satisfied, processing flows to block 410; otherwise, processing loops back through block 406, until such failover criteria is satisfied, or the TMD is removed from service, or the like. Looping back to block 406 is directed towards enabling dynamic changes to the failover criteria to be rapidly incorporated into the monitoring block.

At block 410, the TMD revises its priority for receiving traffic. Processing continues then to block 412, where an advertisement with the revised priority is provided to the centralized router, redundant router, and/or another TMD for use in dynamically revising their routing tables. Process 400 then returns to a calling process to perform other actions.

Figure 5:
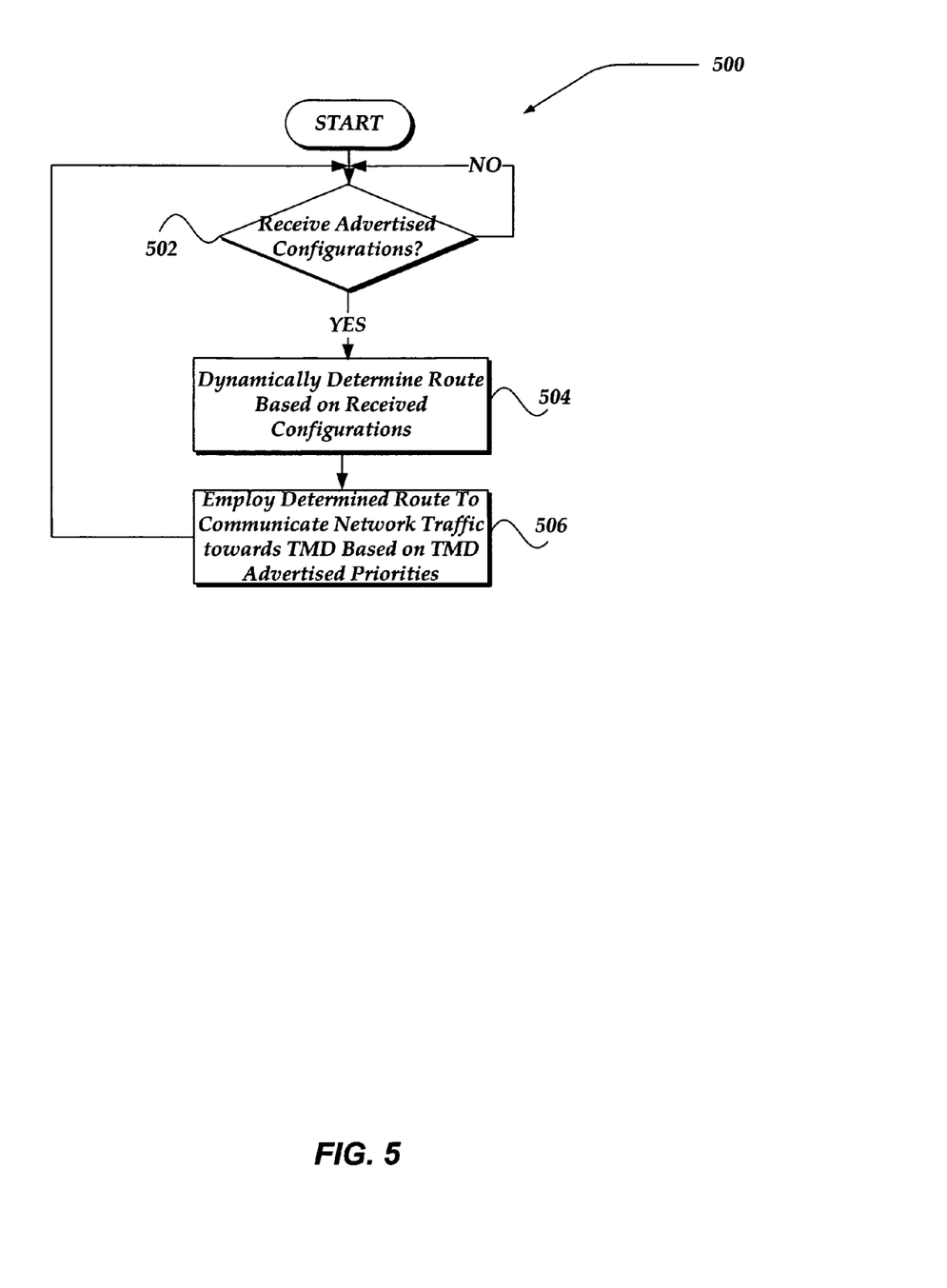
FIG. 5 illustrates a logical flow diagram generally showing one embodiment of a router process for managing dynamic route injection changes during a failover, in accordance with the invention.

FIG. 5 illustrates a logical flow diagram generally showing one embodiment of a router process for managing dynamic route injection changes during a failover, in accordance with the invention. Process 500 of FIG. 1 may be implemented within centralized router 106 of FIG. 1, and/or redundant routers 206-207 of FIG. 2.

Process 500 begins, after a start block, at decision block 502, where a determination is made whether an advertisement is received from at least one of the TMDs. If an advertisement is received, it may have associated with it configuration and dynamic information from the TMD. Such information enables the receiving network device to determine the source of the advertisement, a priority for the TMD, and the like. The advertisement may be received, for example, when a TMD first "comes on line," when a TMD detects a failure condition that results in injecting a route change request through a change in its priority, or the like.

If an advertisement is received, processing flows to block 504; otherwise, processing loop back through decision block 502 until an advertisement is received.

At block 504, routing tables, or the like, are dynamically updated based on the received configuration information. As stated above, virtually any of a variety of dynamic routing protocols may be used. The result of the update may be to dynamically change a selection of which TMD to send traffic towards. Thus, processing flows to block 506, where the updated routing is seamlessly employed to route traffic with minimum delay and virtually transparent to the requesting device. Processing then loops back to decision block 502.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A network device for managing a communication over a network, comprising:
   a transceiver that receives packets addressed to a Virtual Internet Protocol (VIP) address, wherein the VIP address is assigned to the network device and to another network device; and
   a processor that is configured to perform actions, including:
      executing a route injection component that is programmed to perform actions comprising:
      determining a routing priority for the network device;
      advertising the routing priority and the VIP address to a single, centralized router, wherein the router separately receives routing priorities from each of the network device and the other network device using the same VIP address;
      determining if a failover criteria is substantially satisfied;
      if the failover criteria is substantially satisfied, updating the routing priority and advertising the updated routing priority to the router; and
      in response to detecting a change in a failover change condition, automatically modifying the failover criteria based on a detected security condition defining in part the failover change condition, wherein the modified failover criteria effects a change in the determined routing priority for the network device when the modified failover criteria is substantially satisfied and wherein the failover change condition is not part of the failover criteria determined to be substantially satisfied.

2. The network device of claim 1, wherein the processor is programmed to perform actions further comprising:
   modifying the failover criteria based on whether at least one of the following is detected, a predetermined time period, a message is received indicating a change in status of an external resource, a change in a number of servers, or a change of a type of resource.

3. The network device of claim 1, wherein the failover criteria comprises at least one of a failure of a component of a data center supported by the network device, a failure of a number of servers within a plurality of servers that is above a minimum number of servers, a failure of a percentage of servers within the plurality of servers that is above a minimum percentage of servers, a failure of a particular service provided by the data center, a failure of an Internet Protocol address, a predetermined reduction in a quality of service metric, or a load exceeding a predetermined measure.

4. The network device of claim 1, wherein the router is configured to operate as a router centralized within respect to routing of traffic to the network device and the other network device.

5. The network device of claim 1, wherein the network device and other network device each have different physical network addresses from each other, and are each configured to provide their respective physical network addresses to the router.

6. The network device of claim 1, wherein determining the routing priority further comprises determining the routing priority based on a number of available servers within a plurality of servers.

7. A method of managing a communication between a client and a server over a network, comprising:
   advertising a VIP address to a single, centralized router, wherein the Virtual Internet Protocol (VIP) address is assigned to at least two traffic management devices (TMDs) that are each configured to manage a different redundant data center, wherein each redundant data center includes at least one server, and wherein the router separately receives routing priorities from each of the at least two TMDs, each of the at least two TMDs using the same VIP address;
   determining a routing priority for each of the TMDs based, at least in part, on conditions associated with the redundant data centers;
   advertising the routing priorities to the router, wherein the router is configured to direct traffic to at least one of the TMDs in one of the redundant data centers based, in part, on the routing priorities;
   if a failover criteria is substantially satisfied, revising at least one of routing priorities and advertising the at least one revised routing priority to the router; and
   detecting a change in a failover change condition and in response, automatically modifying the failover criteria based on a detected security condition security condition defining in part the failover change condition, and when the modified failover criteria is substantially satisfied, further revising at least one of routing priorities and advertising the at least one revised routing priority to the router and wherein the failover change condition is not part of the failover criteria determined to be substantially satisfied.

8. The method of claim 7, wherein the failover criteria is based on a failure of a number of servers that is above a minimum number of servers.

9. The method of claim 7, wherein the failover criteria is based on a failure of a percentage of servers above a minimum percentage of servers.

10. The method of claim 7, wherein the failover criteria is based on a failure of a particular service provided by at least one of the data centers.

11. The method of claim 7, wherein the failover criteria is based on at least one of a failure of an Internet Protocol address, a predetermined reduction in a quality of service metric, or a load exceeding a predetermined measure.

12. The method of claim 7, wherein the router is centralized within respect to routing of traffic to the redundant data centers based on the advertised priorities and is external to the redundant data centers.

13. The method of claim 7, wherein a non-transitory computer readable storage medium is configured to include program instructions stored thereon, which when executed by at least one processor, cause the at least one processor to perform actions comprising the method of claim 7.

14. The method of claim 7, wherein the failover criteria are detected by at least one of the TMDs.

15. The method of claim 7, wherein the failover criteria comprises at least one of a failure of a component of a data center supported by the network device, a failure of a number of servers above a minimum number of servers, a failure of a percentage of servers above a minimum percentage of servers, a failure of a particular service provided by the data center, a failure of an Internet Protocol address, a predetermined reduction in a quality of service metric, or a load exceeding a predetermined measure.

16. A network device for managing a communication between a client and a server connection, comprising:
    a transceiver to exchange data between the client and the server based, in part, on a Virtual Internet Protocol (VIP) address that is assigned to the network device and another network device;
    means for determining a routing priority for the network device;
    means for providing the determined routing priority to a single, centralized routing device, wherein the routing device separately receives determined routing priorities from each of the network device and the other network device, both the network device and the other network device using the same VIP address;
    revising means for selectively revising the routing priority and providing the revised routing priority to the routing device based on whether a failover criteria is substantially satisfied; and
    means for detecting a change in a failover change condition which in response to detecting the change selectively revises the routing priority based on whether the revised failover criteria is substantially satisfied, wherein the failover change condition is not part of the failover criteria determined to be substantially satisfied, and where the means for detecting a change selectively modifies the failover criteria based on a detected security condition, the security condition defining in part the failover change condition.

17. The network device of claim 16, wherein the means for providing the determined priority further comprises employing a routing advertisement to provide the routing device.

18. The network device of claim 16, wherein the revising means employs a routing advertisement to provide the revised routing priority to the routing device.

19. A system for use in managing a communication over a network, comprising:
    a first traffic management device (TMD) that is assigned a Virtual Internet Protocol (VIP) address, and is configured to perform actions comprising:
        determining a first TMD routing priority;
        advertising the first TMD routing priority to a single, centralized router; and
        if a first failover criteria is substantially satisfied, updating the first TMD routing priority and advertising the updated first TMD routing priority to the router; and
    a second traffic management device (TMD) that is assigned the same VIP address, and is configured to perform actions comprising:
        determining a second TMD routing priority;
        advertising the second TMD routing priority to the router using the same VIP address wherein the router routes at least one network packet to either the first TMD or a second TMD based on the advertised first TMD routing priority and the advertised second TMD routing priority;
        if a second failover criteria is substantially satisfied, updating the second TMD routing priority and advertising the updated second TMD routing priority to the router; and
        detecting a change in a failover change condition, and in response, automatically modifying the second failover criteria based on a detected security condition, the security condition defining in part the failover change condition, wherein the failover change condition is not part of the second failover criteria; and
        detecting that the modified second failover criteria is substantially satisfied, and in response, revising the second TMD routing priority and advertising the revised second TMD routing priority to the router.

* * * * *